ELECTROSTATIC RECORDING OF INFORMATION

Original Filed Nov. 20, 1956 4 Sheets-Sheet 1

INVENTOR.
FREDERICK A. SCHWERTZ
BY
George W. F. Simmons
ATTORNEYS

Nov. 13, 1962 F. A. SCHWERTZ 3,064,259

ELECTROSTATIC RECORDING OF INFORMATION

Original Filed Nov. 20, 1956

4 Sheets-Sheet 2

INVENTOR.
FREDERICK A. SCHWERTZ
BY
George W. F. Simmons
ATTORNEYS

Nov. 13, 1962 F. A. SCHWERTZ 3,064,259

ELECTROSTATIC RECORDING OF INFORMATION

Original Filed Nov. 20, 1956 4 Sheets-Sheet 3

INVENTOR.
FREDERICK A. SCHWERTZ
BY George W. F. Simmons
ATTORNEYS

Nov. 13, 1962 F. A. SCHWERTZ 3,064,259

ELECTROSTATIC RECORDING OF INFORMATION

Original Filed Nov. 20, 1956 4 Sheets-Sheet 4

INVENTOR.
FREDERICK A. SCHWERTZ
BY
George W. F. Simmons
ATTORNEYS

United States Patent Office 3,064,259 Patented Nov. 13, 1962

3,064,259

ELECTROSTATIC RECORDING OF INFORMATION

Frederick A. Schwertz, Pittsford, N.Y., assignor to Xerox Corporation, a corporation of New York Original application Nov. 20, 1956, Ser. No. 623,327. Divided and this application Mar. 7, 1960, Ser. No. 13,119
5 Claims. (Cl. 346—74)

The present invention relates generally to the recording of computational data and more particularly to electrostatic apparatus for the inertialess recording of analog and digital information.

Computational machines, whether of mechanical or electronic design, are broadly classified as either digital or analog computers. A digital device is one performing mathematical operations with numbers in the form of digits which can only assume discrete values. In the analog computer, for purposes of computation numbers are translated into measurable quantities, such as lengths, voltages or angles of displacement, the results being derived by the interaction of moving parts or electrical signals which are so related as to solve an equation or perform a mathematical operation.

Analog and digital computer machines, however complex in structure, are constituted by three basic components; namely, an input system by means of which a problem is introduced into the machine, an operations system including arithmetic and storage elements for carrying out the mathematical functions entailed in solving the problem, and an output system for printing or recording the results.

The written or printed values yielded by the output system may assume any one of several forms depending on the nature of the data and its eventual use. With the recent development of high speed computer machines and other mechanical and electronic devices which produce data at high rates of speed, there has arisen a concomitant need for high speed recording devices, for otherwise the printer or other recording mechanism may act to retard the operation of the entire machine. Where the rate of production of output data exceeds the capacity of the output printer, the usual practice is to store the output information as rapidly as it is produced and to feed it from storage to the printer as rapidly as the printer will accept the information.

To meet the growing need for high speed recording, various types of improved mechanical, electronic and photographic printers have heretofore been devised. But in each prior instance, though greater speeds have been realized, there nevertheless remains a substantial inertia factor which materially limits the ultimate speed attainable.

The mechanical limitations of electric typewriters and multibar printers which act in response to punch tape signals or pulse groups are well known and need not be further considered. Gang printers are also known in which the type is located on drums rotating at constant velocity rather than on bars or levers, printing being accomplished by causing a hammer to strike the paper against the drum as the proper letter is passing by. While such gang printers are sometimes capable of printing more than 200 digits per second, their speed is still well below modern requirements.

To obviate the drawbacks inherent in mechanical bar and gang printers, flash photographic printers have been developed in which an intense light source is modulated by the computational signals, the flashes being photographed to provide a permanent record. But the speed of this device is circumscribed by the maximum rate at which the source can be modulated, as well as by the finite exposure time of the film.

The limitations of photographic techniques are also incident to the so-called "Numeroscope" in which each digit is formed on the face of an individual cathode ray tube and a picture is taken of all the tubes in a row. The smallest figure which can be photographed is a function of the graininess of the film, and the exposure time is a function of the emulsion speed. Other forms of cathode-ray printers have been developed in which the numbers are traced on a screen by a scanning electron beam, but here too it is necessary to photograph the screen image. Consequently, whatever time is gained by using a cathode-ray beam to form the numbers is lost in the photographic process serving to imprint the numbers.

In view of the foregoing, it is the principal object of the present invention to provide an electrostatic technique and apparatus for recording analog or digital information at extremely high rates of speed. A significant feature of the invention resides in the fact that the necessity for accelerating mechanical parts of any kind is altogether avoided.

More specifically it is an object of the invention to provide electrostatic recording apparatus for the purpose described which combines a novel electrostatic image-forming process with standard digital computer switching techniques.

The electrostatic image-forming process in accordance with the invention makes possible the transfer of electrostatic images to the recording medium at extremely high speeds, these images being subsquently rendered visual by methods conventional in the xerographic art. The digital computer switching circuits which coact with the electrostatic image-forming apparatus permit the logical spacial ordering of electrostatic images which owe their origin to information pulses received serially in time.

It is also an object of the invention to provide an electrostatic data recording apparatus whose recording speeds are of the same order of magnitude as those characterizing cathode-ray tubes. Indeed the apparatus in accordance with the invention records information with approximately the same rate of speed at which information may be displayed on the face of a cathode-ray tube and yet precludes both the electron beam and the photographic system commonly required to convert the displayed information into recorded hard copy. In other words, the invention affords a recording system which is essentially inertialess such that when incorporated in the output system of a computer, it will never lag behind the mathematical operations, however rapidly these are carried out.

Some knowledge of xerography is useful toward understanding the principles underlying the present invention. In the art of xerography, an electrostatic charge applied to the surface of a photoconductive insulating layer is selectively dissipated by exposure to a pattern of light and shadow to be recorded, thereby forming on the surface of the insulating layer an electrostatic latent image corresponding to said pattern. An image formed in this fashion may be developed by the deposition of finely divided material in conformity with the charge pattern and thereafter fixed by fusing the powder on the surface of a print to which the powder pattern has been transferred. A detailed description of the xerographic technique and of the apparatus involved in developing and fixing pictures may be found in the U.S. patent to Carlson, No. 2,297,691.

Briefly stated, in the present invention as distinguished from xerography, physical symbols or characters rather than light patterns are recorded as electrostatic images. The images are then developed by depositing a finely divided powder or an ink mist, the resulting visible images being made permanent by fusing or drying. The electrostatic images are produced by character faces or symbol-shaped electrodes which are brought in close proximity to an insulating surface, such as a web of dielectric material. The web is electrostatically precharged by an intense electric field to a point somewhat below a critical stress value.

Transfer of the configuration of the symbol or character from the electrode to the insulating web is effected by the use of a relatively low potential triggering pulse which raises the electric field above the critical stress value to produce a field discharge in the space between the insulating wabe and the electrode. The discharge action gives rise to the formation of an electrostatic pattern of the symbol on the insulating surface. Electronic switching circuits are associated with the electrostatic apparatus to supply trigger pulses thereto in accordance with information received electrically from a digital computer or other signal source.

For a better understanding of the invention, as well as other objects and further features thereof, reference is had to the following detailed description of the invention to be read in connection with the accompanying drawing wherein.

Figure 1:
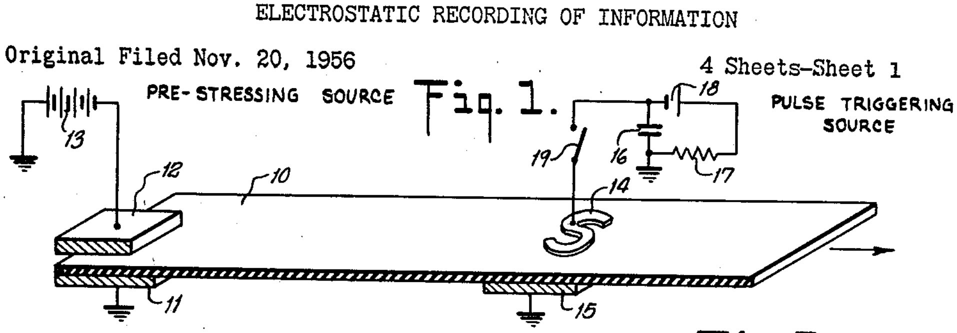
FIG. 1 is a schematic diagram illustrative of the theory underlying the instant invention.

Referring now to the drawings and more particularly to FIG. 1, which is intended to illustrate the theory underlying the invention, there is shown an insulating surface 10, such as a web of Mylar material overlying and in intimate contact with a flat conductive backing member 11. Supported over the surface of the web is a pre-charging electrode 12, the electrode being coated with a radioactive source of ionizing particles, such as a platinum layer which faces the surface of the web. The electrode 12 is supported within a suitable chamber, not shown, and is connected to a high voltage source 13. Elements 11, 12 and 13 constitute a precharging or stressing source for changing said web to a point below the critical stress value. The precharging unit may if preferred be constituted by a corona wire arrangement.

Electric stress through a dielectric material of uniform thickness, such as web 10, may be determined by dividing the magnitude of potential applied thereacross by the quotient of the thickness of the material divided by the dielectric constant thereof. Since the dielectric material is separated from electrode 12 by an air gap having a dielectric constant of 1, the field applied through the gap is found by dividing the voltage across the gap by the thickness thereof.

The critical stress defines that value of electric field strength at which breakdown occurs. It has been found that when there is such breakdown, a transfer or charge migration through the gap takes place. If, on the other hand, an electric stress is below the critical point, dielectric breakdown is not effected and there is no charge transfer. The point at which the charge will transfer can be determined empirically or by the use of critical stress curves. Basic to the present invention is the fact that the web is initially charged to a point below the critical value, the latent image being impressed on the precharged web by applying a triggering voltage to a shaped electrode such as to raise the charge above the critical value.

As presently understood, the nature of the field discharge in the air gap is such that when critical stress is attained, ions which normally are present in the gap are accelerated into collisions with nearby air molecules thereby generating additional ions which similarly collide with molecules to create more ions, this action being cumulative. Charges are also released from the surfaces defining the gap by collisions with these surfaces by the moving ions. The travelling ions so produced deposit on the surfaces controlled by the electric field.

Since the ions created by the electric field are both positive and negative in polarity, the positively charged ions are propelled to the negative surface, whereas the negatively charged ions move to the positive electrode. This results in neutralization of the charges which exist on the respective electrodes and also in the deposition of the new charges which raise the amount of charge deposited on the electrode surface. For example, where there exists negative charges on the surface and positive charges are moved thereto, neutralization takes place and the charge density of the negative surface is reduced. But if the surface is initially neutral and charges are moved thereto by the electric field in the gap, the deposition of additional or new charges takes place on the surface without neutralization, thereby raising the charge density as controlled by the field on the previously neutral surface.

Thus air ionization which takes place in the gap creates a conductive region and allows charge flow between the surfaces defining the gap to effect a charge migration therebetween. This type of air ionization and air travel continues while the electric stress is above critical stress, but for a value below critical stress it has been found that once current flow through ion movement in the gap has started, and as deposition takes place, the electric stress in the gap is reduced by the deposited charges which changes the field strength across the gap until charge migration stops.

It is known that if a shaped metal character or symbol is disposed a short distance above an insulating surface, and the latter is supported by a grounded metal plane, a potential applied between the shaped character and the grounded plane causes an electrostatic image of the character to appear on the insulating surface. Depending on the polarity of the applied potential, the electrostatic image is either positively or negatively charged. In either event, the image may be rendered visible by cascading over it an oppositely charged pigment or plastic powder, called a toner.

It is also known that under proper conditions legible images can be obtained by charge transfer through air gaps as great as ten thousandths of an inch provided sufficiently large voltage pulse is applied, the voltage requirement ranging from several hundred to several thousand voltages depending upon the separation of the electrodes. Short voltage pulses of this high amplitude are difficult to generate and control, particularly when trains of such pulses are to be used in conjunction with complex switching circuits.

In accordance with the present invention, it has been found possible to minimize the pulse amplitude entailed in forming electrostatic images of shaped electrodes by precharging the insulating surface to a point somewhat below the critical stress value and then making use of a relatively small triggering or ignition pulse to effect the dielectric breakdown at which charge transfer takes place. In other words, the web is first precharged uniformly to a point of incipient breakdown, the triggering voltage supplementing the charge on the web to effect breakdown in those areas encompassed by the shaped electrode.

Thus, as shown in FIG. 1, after the web 10 is uniformly pre-charged to a point below the critical stress value, it passes under a shaped electrode 14 which, by way of illustration, is in the configuration of the letter S, the web below the shaped electrode being supported by a grounded metal plane 15. The triggering pulse to effect the charge transfer is produced by a condenser 16 charged through a resistor 17 by a relatively low voltage source 18, the voltage pulse being applied by a switch 18a to the shaped electrode 14. An electrostatic latent image of the S will thereby be formed on the web, which image may thereafter be developed and fixed in the usual manner. The triggering pulses may, of course, originate in a computer machine.

Figures 2, 6:
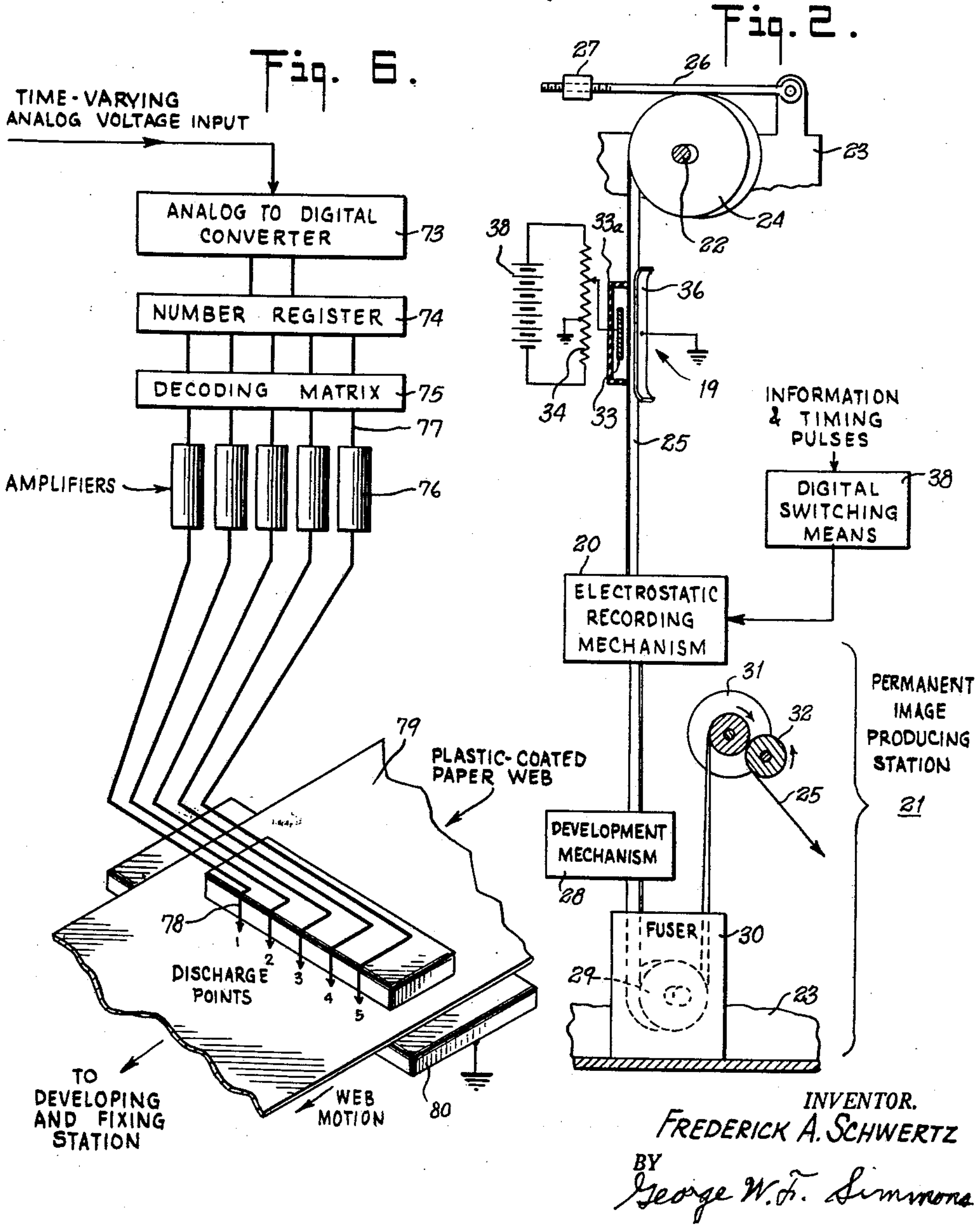
FIG. 2 is a schematic diagram showing a preferred embodiment of an electrostatic system in accordance with the invention for recording digital data.
FIG. 6 is a fourth preferred embodiment of an electrostatic system for recording analog information.

Referring now to FIG. 2, there is shown an electrostatic information-recording apparatus in accordance with the invention, the main components of the apparatus being a pre-stressing stage, generally designated by numeral 19, an electrostatic recording mechanism 20, and a permanent image-producing station 21. A spindle 22 at the top of a suitable framework 23 carries a supply roll 24 of sheet insulating material which is fed from the roll as a continuous web 25 and drawn downwardly into the recording and image-producing stations 20 and 21. The framework may be constituted by a pair of vertical side plates with rods or support members between them on which the working parts are mounted.

The term "insulating or web material" as employed herein is intended to refer to dielectric substances having a sufficiently high resistance under conditions of use as to hold an electrostatic image for a period which permits subsequent utilization of the image by transfer to another surface or by development. It will be evident that the more rapid the processing cycle the lower the resistance which can be tolerated. Among the image transfer materials which may be used are plastic films, such as polyethylene, cellulose acetate, ethyl cellulose or polyethylene terephthalate and dried or coated papers or the like having a resistivity in the order of about $10^{12}$ ohm-centimeters. The web preferably has a thickness in the order of one or two mils.

A controlled tension is applied to the web by a sliding plate 26 which rests on top of roll 24 and whose pressure may be varied by adjusting the longitudinal position of a leverage weight 27. The web after travelling through the pre-stressing stage 19 and recording stage 20, then goes through the development mechanism 28 of the image-producing station 21 and passes under the drum 29 in a fuser 30. The web thereafter goes up and around a web-advance roller 31 and out between this roller and an idler roller 32.

As the web leaves supply roll 24, it first passes through the pre-stressing ionization stage 19 which comprises an ionization electrode 33 housed in a chamber 33a and connected to the adjustable slider of a potentiometer 34 whose center tap is grounded, a voltage source 35 being connected across the potentiometer element. A grounded metal plate 36 bears against the back of web 25 at this location whereby by varying the potentiometer slider relative to the center tap an electric field of a desired polarity and intensity may be established between ionization electrode 33 and the web. The intensity of this field is adjusted so that the web is charged uniformly to a point somewhat below the critical stress value at which charge migration takes place.

The precharged or pre-stressed web leaving the stage 19 then enters the recording mechanism 20 wherein triggering voltages derived from a digital switching system 38 are applied to suitably shaped electrodes to effect a field discharge causing a charge transfer, thereby forming an electrostatic latent image on the web having the same form as the electrode. The operation and structure of the recording mechanism will be described in greater detail in connection with FIG. 3.

As the web proceeds downward from the recording stage 20, it passes through the development mechanism 28 wherein the invisible electrostatic images are rendered visible by depositing thereon a finely divided material, such as an ink mist or an electroscopic pigmented resin powder which adheres to the negatively charged image areas. To promote development, the particles are preferably charged positively by triboelectric or other means.

If a uniform positive charge has been applied to the web by the pre-stressing stage, the particles are repelled from all areas of the web except the negatively charged image areas. A suitable powder development mechanism is fully disclosed for example in the Carlson Patent No. 2,357,809 and in the Walkup and Fauser Patent No. 2,573,881, and a mechanism for developing electrostatic images with an ink mist is disclosed in Carlson Patent No. 2,551,582.

After leaving the development mechanism and entering the fuser 30, the resin powder images are heated in a suitable oven to a temperature sufficient to fuse the resin. If liquid ink development is used, the fuser may serve merely as a heated drier for the ink. With webs formed of plastic materials which tend to distort when heated, it is preferred that the fuser shall consist of a chamber filled with air saturated with vapor or solvent for the resin images and not for the web material. Solvent is absorbed by the powder until it becomes tacky or semifluid and as the web leaves the fuser, the solvent evaporates leaving a fixed resin image on the web. With coated paper, a solvent for the plastic may be used, in which case it is possible to use infusible electroscopic powders, for they become embedded in the plastic or wax coating which is softened by heat or solvent as it passes through the fuser. A suitable vapor fuser is disclosed in the Carlson application, Serial No. 299,673, filed July 18, 1952.

Instead of fixing the powder images on the original web, it is possible to transfer the images to another sheet or surface by an electrostatic transfer method, such as is shown in Schaffert Patent No. 2,576,047, or by rolling against an adhesive coated surface. Thus the resin images can be transferred and affixed to paper offset mats for use in offset printing or multiple copies. It is to be understood that means for development and printing of electrostatic images forms no part of the present invention, and any known means may be used for this purpose.

Figure 3:
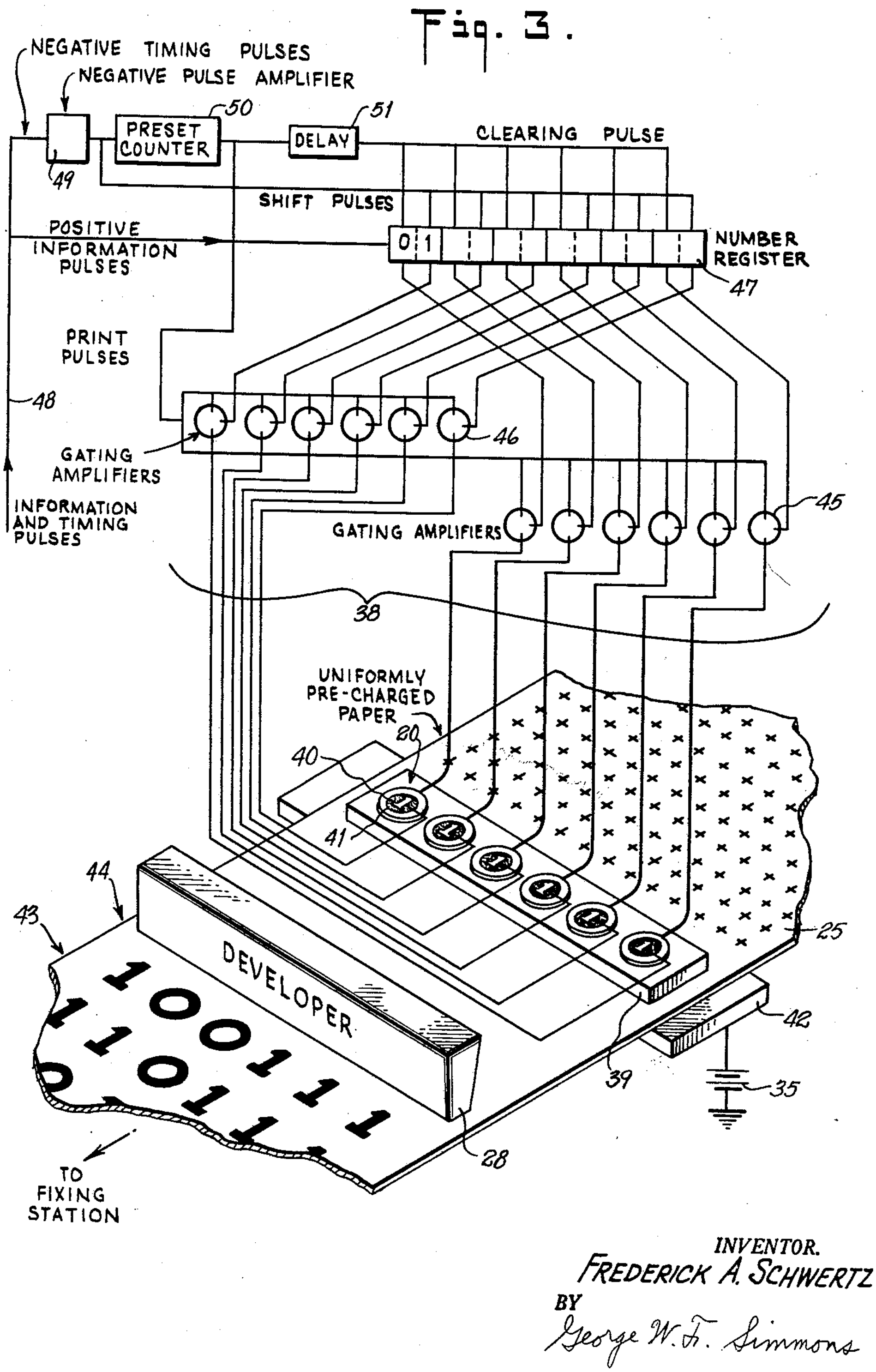
FIG. 3 is a view, partly in perspective, showing the electrostatic electrode structure of the device illustrated in FIG. 1, as well as the associated switching circuits.

Referring now to FIG. 3, the electrode structure of the recording mechanism 20 and of the digital switching circuit 38 for applying pulses thereto is shown in greater detail. The electrode structure is constituted by an insulating strip 39 which is positioned transversely relative to the upper face of the moving insulating web 25, a series of dual electrodes being embedded or otherwise mounted at spaced positions along the strip. Each dual electrode is made up of a conductive element 40 shaped as the numeral 1, element 40 being placed within and insulated from a second conductive element 41 which is shaped as the numeral zero.

The electrode structure, as shown in FIG. 3, is adapted to record binary numbers each of which is 6 digits in length, one 6 digit number for each line. The binary number system admits the marks 0 to 1 at each position and no others. Therefore to translate the digits 0 to 63 to binary terms, a six position binary system is required in which 0 is represented by binary 000000, decimal 1 by 000001, decimal 2 by 000010, decimal 3 by 000011, etc., and decimal 63 by 111111. The six place configuration of electrodes in FIG. 3 is suitable for recording 6 binary digits, the equivalent of the decimal numbers 0 to 63 inclusvie, but it is to be understood that the invention is by no means limited to a six place configuration.

Below the web 25 in parallel alignment with the electrode structure is a conductive back plate 42 which may be grounded. In operation, triggering pulses are applied either to the "1" or "0" element of each dual electrode, the pulses having magnitudes such that when added to the pre-stressed value of the web, a point above critical stress is reached, this produces a field discharge in the air gap between the shaped electrode and the web, and thereby forms a charge pattern on the web.

Assuming, for instance, that pulses are simultaneously applied to the dual electrodes whereby the shaped electrodes 110111 in the series thereof are activated, then, after development, the web will exhibit these same characters as shown along line 43 on the web. If thereafter pulses are simultaneously applied to the dual electrodes whereby shaped electrodes 100111 in the series thereof are activated, the web after development will exhibit these same characters along the next line, designated by numeral 44.

While the binary pulses from the computer arrive serially in time, by proper switching circuit electrostatic images from all the electrodes may be formed simultaneously or parallel in time. In this way a line at a time can be printed. It is conservatively estimated that a new set of electrode images could be put down every ten microseconds with the structure shown herein. For a 32 digit line, this implies a printing rate of over 3 million digits per second. For characters of typewriter size, assuming six lines per inch, this means a paper speed of over 1,000 ft. per second.

Thus the speed of the paper handling mechanism ultimately determines the printing rate, assuming that the developing and fixing steps could be carried out at leisure. Since electrostatic images have heretofore been developed at rates of 25 ft. per second, at this rate 1800 lines per minute of characters of typewriter size or $$1800\times 32=57,600$$

binary digits could be developed out per second.

The switching mechanism 38 for presenting the pulses simultaneously to the electrode structure includes a first set of six gating amplifiers 45 and a second set of six gating amplifiers 46, as well as a number register 47 having six stages in cascade relation. The fore section of each register stage is connected to the corresponding gate in gating set 46 and the register section to the corresponding gate in set 45. The output of gates 45 are connected to the "0"-shaped elements and the output of gates 46 are connected to the "1"-shaped elements of the dual electrodes.

The binary pulse data is in the form of input information pulses and timing pulses, and may be obtained, for example, from a magnetic tape in the operations system of the computer. The information pulses are assumed to be positive and the timing pulses negative. These pulses are delivered serially on a single channel 48 in time sequence. The positive information pulse is used to designate a binary "1" and the absence of a pulse (blank) a binary "0." The information and timing pulses are interlaced so that a positive information pulse or a "blank" is always followed by a negative timing or shift pulse.

The information and timing pulses carried in channel 48 are applied to the input of the number register 47 as well as to the input of a negative pulse amplifier 49 which amplifies only the timing pulses, the output of the amplifier being fed to the second section in the various stages of the number register 47 to effect a shifting action. The output of amplifier 49 is also applied to a preset counter 50 which emits a single pulse after a predetermined total count is accumulated. The output pulse of the counter is applied as a clearing pulse through a delay circuit 51 to the first section of the various stages in the number register 47. The output of the preset counter 50 is also fed to the two sets of gating amplifiers 45 and 46.

To set the stage for the operation of the circuit, it is assumed at the outset that the number register 47 is cleared and that the pulse train conveyed on channel 48 begins with a positive information pulse. This pulse will insert a "1" in the number register 47. A negative timing pulse will follow which will not activate the number register but will supply a shift pulse to the number register 47 and a pulse to the preset counter 50. The preset counter is adjusted in this instance so that it will emit a pulse after a total count of six, inasmuch as binary numbers six digits long are to be printed. This output pulse from preset counter 50 is used to open the gating amplifiers 45 and 46 and also after a slight delay determined by delay network 51 to provide a clearing pulse for the number register 47. The preset counter is then in position to accept the next group of six information pulses.

Thus in operation, the information pulses which are received serially are stored in the number register each of whose six stages are activated in accordance with a digit in the binary number. After the binary number is read into the number register, the digits thereof are read out in parallel when the gating amplifiers are activated by the preset counter, thereby applying appropriate ignition or triggering pulses to the dual electrodes 40, 41 to form the electrostatic pattern on the web.

As an alternative to pre-stressing the web 25 by a separate electrode structure 19, in the manner shown in FIGS. 1 and 2, it is also possible to apply the presetressing potential to the recording electrode structure. This may be effected by means of a biasing battery 35 connected between the back plate 42 and ground.

Figure 4:
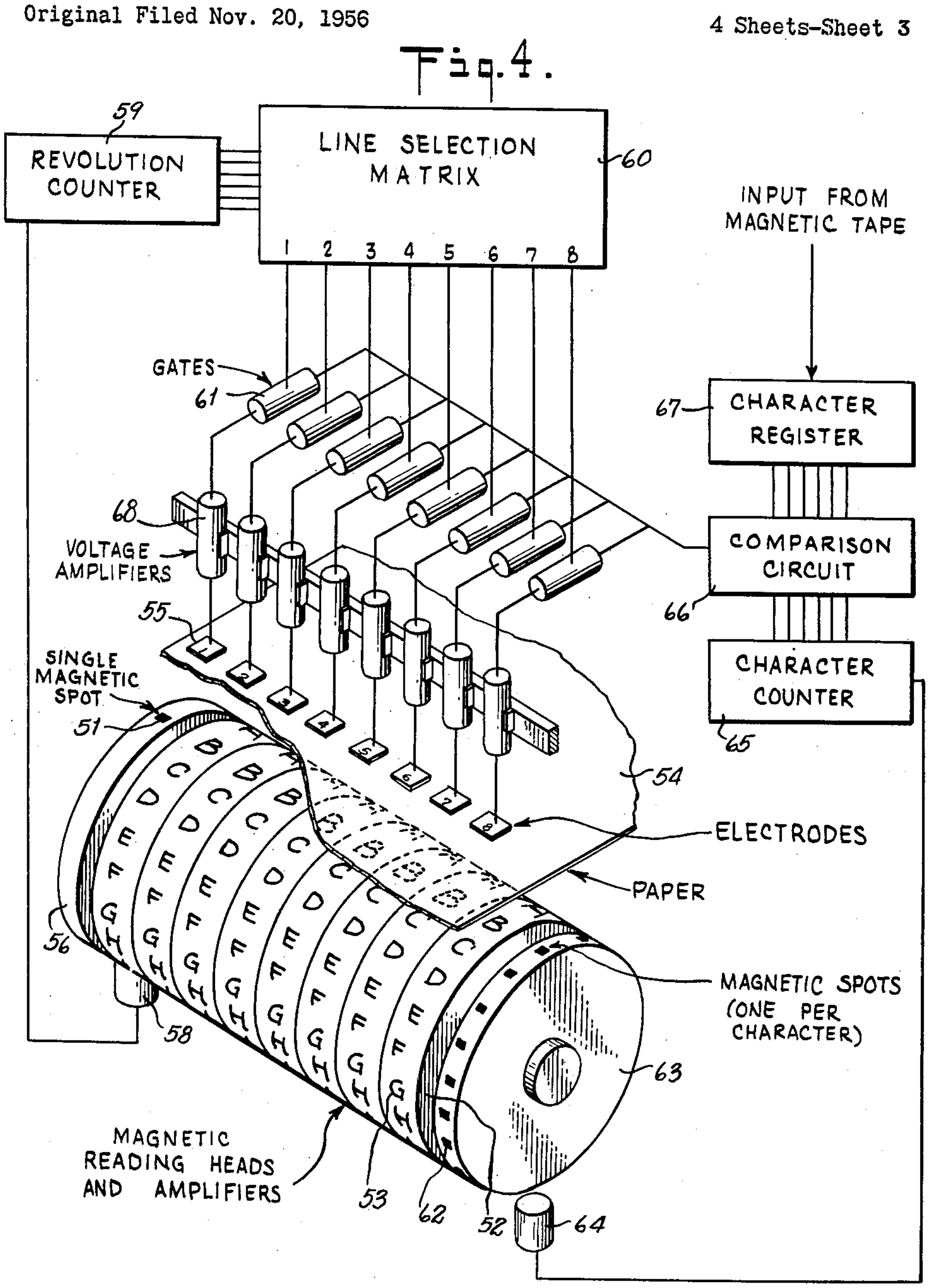
FIG. 4 is a schematic diagram of a second embodiment of an electrostatic system for recording information in the form of alphabetical and numerical symbols, the electrode structure being shown in perspective.

The printing arrangement disclosed in connection with FIG. 3 is adequate dhere two binary symbols or at most a few symbols are to be recorded. Where, however, it is desired to construct an electrostatic printer capable of reproducing all of the alphabetical symbols as well as the decimal digits, then it is necessary to employ, say a five by seven matrix of points at each digit position. These points must be pulsed in selective groups in such a way as to form the desired characters. Such an arrangement would entail a highly complex and expensive switching system. To overcome this drawback and to make it possible to print alphabetical as well as digital symbols, there is provided an electrostatic electrode structure as illustrated in FIG. 4.

The recording device includes a cylinrical drum 52 rotatably mounted and driven at a constant angular velocity. Circumferentially disposed at equi-spaced points about the drum are several groups of raised characters 53 formed of conductive material, each group constituting a ring. One ring of characters is provided for each column of printed page. The characters in each ring thereof are composed of the symbols A to Z and 0 to 9 so that both alphabetical and numerical information may be selectively recorded.

An insulating web 54 is arranged to pass tangentially over the rotating character drum. Above the web is transversely disposed an array of stationary electrodes 55, one for each ring of characters. In operation, when a selected character passes opposite a chosen electrode, the electrode is subjected to a triggering pulse. Since the web is pre-stressed below the critical value, the triggering pulse acts to raise the stress above the critical value to produce a field discharge between the character and the web and thereby form a charge pattern having the shape of the selected character.

The manner of sequentially selecting the proper character ring and the particular character therein involves the use of digital computer techniques. For this purpose, mounted on the left hand side of the character drum 52 and rotating therewith is a disc 56 containing a single magnetic mark 57. A magnetic reading head 58 disposed below the disc picks up a pulse for each revolution of the drum, which pulse is instantly transmitted to a revolution counter 59.

For each position of the revolution counter 59, one and only one of the lines marked 1 to 8 on a line selection matrix 60 is energized, the remaining seven lines being held at ground potential. The energized line must not however activate the selected electrode until the chosen character is immediately below the electrode. The energized line is therefore connected to a gate 61 which is rendered operative only when subjected to the action of two energizing signals.

The second signal or energized line activates the gate only when the selected character is under the selected electrode. This is accomplished as follows: Magnetic marks 62 are embedded at circumferentially spaced positions on a disc 63 attached to the right side of the drum, there being a magnetic mark for each character in the ring. These marks which are aligned with characters are sensed by a magnetic head 64 disposed below disc 63 and transmitted to a character counter 65. The generation of the counting and shift pulses effected by discs 56 and 63 may also be accomplished mechanically by toothed discs actuating suitable switches.

The number in the character counter is compared in a comparison circuit 66 with the number inserted in a character register 67 by any suitable source of input digits, such as a magnetic tape system. When these two numbers agree, an output pulse is emitted by the comparison circuit 66. At the moment line 5, for example, is activated by a pulse from comparison circuit 66, the gate 61 under line 5 will transmit a pulse through a voltage amplifier 68 to the fifth electrode 55, thus producing a charge pattern corresponding to the selected image. After all the character images are formed, the charge patterns may be developed and fixed by the usual method.

Although the drawing in FIG. 4 shows an 8 column printer, the page width could be readily increased to as many columns as desired by the use of additional character rings, associated electrodes and circuits therefor. In the structure shown, in order to print as full line across the web, the character drum must complete as many revolutions as there are columns to be printed. If the angular velocity of the drum is made very high relative to the velocity of the web, the printed line will be substantially straight across. However, to compensate for any slanting which may occur in the printing, the drum may be placed at a slight angle relative to the paper or the rings may be displaced relative to each other.

The electrostatic printer in FIG. 4 can also be made to print a full line for every revolution of the character drum, rather than for every 8 revolutions or as many revolutions as there are character rings. This may be accomplished, as shown in FIG. 5, by the use of the same character drum 52, the eight rings of characters 53 on the drum and eight fixed electrodes 55 being arranged in a switching circuit adapted to print an 8 column line for a single revolution of the drum.

Figure 5:
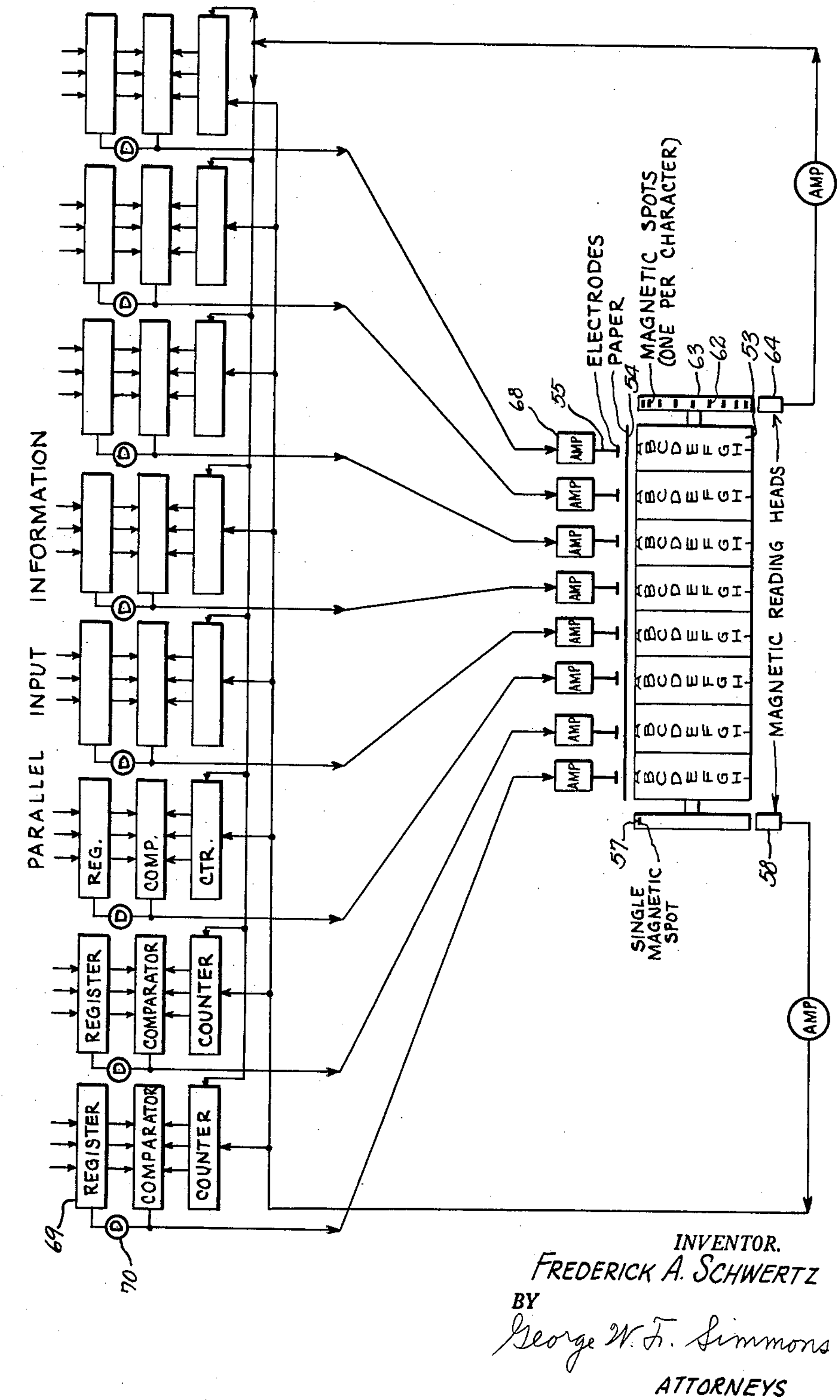
FIG. 5 is a third preferred embodiment of an electrostatic system for recording alphabetical and numerical symbols a line at a time.

In the switching circuit shown in FIG. 5, a register 69 is provided which stores the character to be printed in the corresponding column in the line. Pulses intercepted by magnetic head 64, operating in conjunction with magnetic marks 62 on disc 63, are fed to counters 71 to indicate which one of the group of characters in the rings is under the electrodes. Like characters in the several columns occupy corresponding angular positions, hence at any one instant all of the A's will be under the electrodes, then all of the B's, etc.

When coincidence occurs between the number registered in the counter 71 and the character register 69, a comparator 72 connected to both the counter 71 and the register 69 produces an output pulse which causes an electrostatic charge to be transferred to the paper in the corresponding column. The pulse which causes the image transfer also clears the character register after a slight delay by means of a delay circuit 70.

Electrostatic images are transferred to the paper in random fashion until all eight images are impressed and all eight registers are cleared and ready to receive new information. The paper may then move ahead to the next line position and thereupon new information enters into the register. The printer is now ready for the next cycle.

The rate of rotation of the character drum establishes an upper limit to the number of lines which can be printed per unit time. On the other hand, there is really no lower limit to the rate at which the printing may proceed because the printer operates asynchronously and is ready to receive and reproduce information instantaneously.

The upper limit at which the printer may operate in terms of lines per minute is effectively determined by the rate at which the paper may be physically advanced under the electrodes from one line position to the next.

The advantages of the electrostatic image-forming process disclosed herein may also be utilized for the inertialess recording of analog information. The arrangement shown in FIG. 6 may be used to record a time-varying analog voltage, the recording being accomplished by first translating the analog voltage input in a suitable converter to its digital equivalent.

An analog-to-digital converter is a device, such as a digital voltmeter, which accepts instantaneous values of continuous variable qualities and expresses them in discrete numerical form. Another example of such a converter is a crystal-controlled pulse generator and an associated ring counter adapted to measure and express time intervals in discrete numbers of electrical pulses. Still another example is a device for converting speed of rotation to digital form, or mechanical counters in which electrical pick-offs at discrete positions on a shaft are used to generate electrical signals representing the angular shaft position. Any known type of analog-to-converter may be used within the context of this invention.

The digital number yielded by converter 73 is set up in a number register 74. The number in the register is then decoded by a line selection matrix 75 which places a potential through an amplifier 76 on only one of the several output lines 77. This potential causes a field discharge in air at a point electrode 78 which transfers a point shaped electrostatic image to the insulating surface of an insulating web 79 by virtue of the discharge between the point electrode and the grounded metal plane 80. The web, which may be a plastic coated paper, is prestressed in the manner previously described.

When the number "one" is in the register 74, the first of lines 77 will be activated, when number "two" is in the register, the second line will be activated, etc. In other words, the higher the instantaneous value of the analog voltage, the higher the number of the line which is activated. If then the paper is caused to move at a uniform rate, a series of electrostatically charged points will trace out a curve constituted by a train of dots. This curve can be made visual by the usual developing and fixing techniques.

The resolution which can be obtained by the above-described process depends on the accuracy required. For example a seven binary bit register can be used to control 128 output lines operating in conjunction with a like number of closely spaced point electrodes. These electrodes may readily be fabricated by standard photomechanical etching procedures. It is possible with this arrangement to obtain recording accuracies of better than 1%. As pointed out previously, the recording paper is precharged so that recording pulses of minimal amplitude may be used to effect the charge transfer. In practice the paper may be charged to just below the point of critical stress, so that only relatively small recording pulses are needed to effect charge transfer.

While there have been shown what are considered to be preferred embodiment of the invention, it will be manifest that many changes and modifications may be made therein without departing from the essential spirit of the invention. It is intended, therefore, in the annexed claims to cover all such changes and modifications as fall within the true scope of the invention.

This application is a division of my copending application Ser. No. 623,327, filed November 20, 1956 (now abandoned).

I claim:

1. Apparatus for recording digital information constituted by a series of binary pulses, said apparatus comprising an array of dual electrodes of binary number elements each including an element shaped as a binary "zero," a moving web of insulating material, said array of electrodes being fixedly disposed transversely with respect to said web, means to electrically pre-stress said web below the critical electrical stress value at which charge transfer occurs, and means to apply said binary pulses to elements of said array with an intensity sufficient to raise said stress above critical value whereby a charge transfer is effected from said pulsed elements onto said web producing a charge pattern in accordance with said binary numbers.

2. Apparatus for recording digital information constituted by a series of binary pulses, said apparatus comprising an array of dual electrodes of binary number elements each including an element shaped as a binary "one" and an element shaped as a binary "zero," a moving web of insulating material, said array of electrodes being fixedly disposed transversely relative to said web, means to electrically pre-stress said web below the critical electrical stress value at which charge transfer occurs, means to apply said binary pulses to elements of said array with an intensity sufficient to raise said stress above critical value whereby a charge transfer is effected from said pulsed elements onto said web producing a charge pattern in accordance with said binary numbers, and powder means to develop and fix said charge pattern to produce a permanent record.

3. Apparatus as set forth in claim 2, wherein said dual electrodes in said array are constituted by a "one" shaped conductive element disposed within and insulated from a "zero" shaped conductive element.

4. Apparatus for electrostatically recording digital information constituted by a train of information pulses, said apparatus comprising a moving web of insulating material, means to electrically pre-stress said material to a point below the critical electrical stress value at which charge transfer occurs, a recording electrode structure provided with an array of dual elements constituted by a "1" shaped conductive element disposed within and insulated from a "0" shaped element, a first plurality of gating amplifiers connected respectively to said "1" shaped elements to apply pulses thereto, a second plurality of gating amplifiers connected respectively to said "0" shaped electrodes to apply pulses thereto, and means responsive to said information pulses to render the appropriate gating amplifiers in said first and second plurality thereof operative whereby only those elements in said dual electrode structure are pulsed which correspond to the binary information in said pulse train, said pulses having an intensity sufficient to raise said stress above critical value to effect a charge transfer from said pulsed elements to said web.

5. Apparatus for electrostatically recording digital information constituted by a train of information pulses interlaced with timing pulses, said apparatus comprising a moving web of insulating material, means to electrically pre-stress said material to a point below the critical electrical stress value at which charge transfer occurs, a recording electrode structure provided with an array of dual elements constituted by a "1" shaped conductive element disposed within and insulated from a "0" shaped element, a first set of gating amplifiers connected respectively to said "1" shaped elements to apply pulses thereto of sufficient intensity to raise said stress above critical value, a second set of gating amplifiers connected respectively to said "0" shaped electrodes to apply pulses thereto of sufficient intensity to raise said stress above critical value, a number register comprising a plurality of stages coupled in cascade relation, each stage including a fore section and a rear section, the fore sections of said stages being connected to said first set of gating amplifiers, the rear sections being connected to said second set of gating amplifiers, means to apply said information pulses as an input to said number register, means to apply solely said timing pulses to each stage of said register to effect a shifting action whereby said register is activated in accordance with said information train, a preset counter responsive to said information train to produce a control pulse when the total number of pulses in said train has been accumulated and means to supply said control pulse to said gating, amplifiers to render same operative to apply appropriate pulses to said electrodes to effect a charge transfer from said pulsed elements to said web.

References Cited in the file of this patent

UNITED STATES PATENTS

| | | |
|---|---|---|
| 2,930,847 | Metzger | Mar. 29, 1960 |
| 2,944,147 | Bolton | July 5, 1960 |
| 2,951,121 | Conrad | Aug. 30, 1960 |
| 2,955,894 | Epstein | Oct. 11, 1960 |

UNITED STATES PATENT OFFICE

CERTIFICATE OF CORRECTION

Patent No. 3,064,259 November 13, 1962

Frederick A. Schwertz

It is hereby certified that error appears in the above numbered patent requiring correction and that the said Letters Patent should read as corrected below.

Column 3, line 50, for "changing" read -- charging --.

Signed and sealed this 28th day of April 1964.

(SEAL)
Attest:

ERNEST W. SWIDER
Attesting Officer

EDWARD J. BRENNER
Commissioner of Patents